United States Patent [19]

Eckhardt

[11] Patent Number: 5,475,535
[45] Date of Patent: Dec. 12, 1995

[54] CONDENSERS FOR OVERHEAD PROJECTORS

[75] Inventor: Stephen K. Eckhardt, Austin, Tex.

[73] Assignee: Minnesota Mining Manufacturing Company, St. Paul, Minn.

[21] Appl. No.: 348,376

[22] Filed: Dec. 1, 1994

Related U.S. Application Data

[62] Division of Ser. No. 40,483, Mar. 31, 1993, Pat. No. 5,400,094.

[51] Int. Cl.[6] .............................. G02B 3/02; G02B 13/18
[52] U.S. Cl. ........................... 359/709; 359/718; 359/651
[58] Field of Search .................................. 359/718, 651, 359/709

[56] References Cited

U.S. PATENT DOCUMENTS 4,537,474  8/1985  Asterö ...................................... 359/651

FOREIGN PATENT DOCUMENTS

| 0250321 | 12/1985 | Japan | 359/718 |
|---|---|---|---|
| 0011715 | 1/1986 | Japan | 359/718 |
| 0070519 | 4/1986 | Japan | 359/718 |
| 0261711 | 11/1986 | Japan | 359/718 |
| 0182130 | 6/1921 | United Kingdom | 359/709 |

*Primary Examiner*—Georgia Y. Epps
*Assistant Examiner*—Evelyn A. Lester
*Attorney, Agent, or Firm*—Gary L. Griswold; Walter N. Kirn; Jack V. Musgrove

[57] ABSTRACT

A family of condenser lenses for an overhead projector (OHP) are designed to balance overall brightness in the projected image versus uniformity of illumination. The lenses are plano-convex and aspheric, and their conic constant is a function of the radius of curvature. The radius of curvature is further selected from a range which depends upon the size of the stage of the OHP. Preferred values of other parameters of the lens and OHP optical system are selected to complement the lens design. The lens is constructed of a heat-resistant material, such as borosilicate, to withstand the high temperatures generated by the incandescent lamp within the OHP base. Condenser lenses which are members of the described family provide performance, in terms of total luminous flux and uniformity of that flux, which is superior to the performance of previous designs.

9 Claims, 2 Drawing Sheets

CONDENSERS FOR OVERHEAD PROJECTORS

This is a division of application Ser. No .08/040,483 filed Mar. 31, 1993 now U.S. Pat. No. 5,400,094.

BACKGROUND OF THE INVENTION

1. Field of the Invention

The present invention generally relates to optical projection systems, and more particularly to a condenser lens for an overhead projector which is constructed to balance overall brightness and degree of uniformity.

2. Description of the Prior Art

Overhead projectors (OHP's) are known in the art, and generally comprise a base having a light source, a stage area, and a projector head located above the stage. A condenser lens in the base directs light toward the stage, and a Fresnel lens at the stage gathers the light and directs it to a projection lens in the head, which projects any transparent image placed on the stage. Two important characteristics of the projected image are overall brightness and uniformity of the illumination.

Brightness has become more important as the use of color transparencies and liquid crystal display (LCD) panels in combination with OHP's has become more prevalent. Three important factors in achieving high brightness are lamp construction, collection of the light and utilization of the light which has been collected.

Lamp construction can be varied in several ways to obtain increased brightness. One variable is the means by which electrical energy is converted into light. The two most common types of projection lamps according to this classification scheme are incandescent and arc discharge lamps. Arc lamps convert the electricity to light more efficiently than incandescent lamps do, but their cost and the cost of the appropriate power supply has restricted their use to the most expensive projectors. Incandescent lamps are used in the vast majority of projectors. In particular, tungsten-halogen incandescent lamps are used because their light output is relatively constant over their life. If one is restricted to tungsten-halogen technology, the only way to increase brightness without sacrificing lamp life is to use a higher wattage lamp.

The inefficiency of incandescent lamps is due to the fact that most of the electrical energy is converted into infrared radiation. Infrared radiation is absorbed by many materials, including glass, causing them to heat up. The amount of heat generated by a normal projection lamp is not enough to soften a glass condenser, but it does cause the condenser to expand in proportion to the amount of energy received. This means that the central portion of the condenser, which is closest to the filament and receives the most radiation, expands more than the outer portions. Such differential expansion can cause a condenser to crack. For lower wattage incandescent projection lamps, tempering a soda-lime glass condenser is sufficient to protect it from cracking. Higher wattage lamps require a type of glass which is more resistant to thermal stress, such as borosilicate glasses. PYREX brand glass is a common glass of this type.

Another technique for increasing brightness is the judicious selection of a condenser which gathers as much of the light from the source as possible and directs it through the stage. The amount of light collected by the condenser is governed by its collection angle. This is defined as the angle between the axis of rotation of the condenser and a line from the center of the light source to the edge of the condenser. This angle is affected by the distance from the filament to the closest side of the condenser and the diameter of the condenser. The condenser is normally placed as close to the lamp as is mechanically feasible, so only the diameter is variable. Increasing the diameter increases the collection angle, but it also increases the necessary thickness of the condenser. Increasing the thickness increases both its cost and its susceptibility to thermal stress.

Third of the aforementioned contributors to brightness is the utilization of the collected light. If all of the collected light could be aimed so that it would pass through the stage, utilization would be perfect. Due to several factors, however, increased utilization often results in poor distribution of the light across the stage and, hence, uneven illumination of the projection screen. In the simplest example of this relationship, a system may be constructed wherein nearly all of the light passes through the stage in a circular beam but, due to the square shape of the stage, the corners are dark or black. The beam may be expanded and flattened toward a more square shape, but there will still be some fading of illumination at the corners, and increasingly more light will fall outside the stage perimeter as the uniformity of illumination improves, thus decreasing overall brightness. This trade-off is discussed in U.S. Pat. Nos. 1,946,088, 2,637,242, 5,010,465 and 5,092,672.

Some evenness in light distribution may be achieved by providing an optical system having several lens components. This multiplicity of lenses, however, is contrary to the desideratum of minimizing part count to simplify manufacturability and reduce cost, and multiple lenses also decreases brightness due to surface reflections. An alternative approach is to vary one or more parameters in the OHP optical system other than the condensing system. For example, a common prior art technique for "optimizing" the brightness/uniformity balance has been to adjust the distance from the lamp filament to the Fresnel lens at the stage while viewing the projection screen (using the same condenser throughout the process). Another trial-and-error approach is to substitute different condenser lenses from a selection of such lenses. The most obvious flaw in these approaches is the subjective judgment involved in determining the optimum balance of brightness and uniformity. These are also ad hoc approaches which may suffer from unnecessary design constraints, such as the specific lens constructions in the limited selection of lenses. It would, therefore, be desirable and advantageous to devise a method for determining the construction of a condenser lens providing improved brightness/uniformity balance, the construction being limited to a single lens component, and based on other known parameters of the OHP's optical system.

SUMMARY OF THE INVENTION

The present invention comprises an aspheric condenser lens for an overhead projector, constructed to provide a superior balance of total luminous flux versus uniformity of illumination on the projection screen. This construction results in near maximum overall brightness for a given degree of uniformity or, conversely, yields an excellent degree of uniformity given a desired luminosity. The invention relates to a family of such condenser lenses, for use in any OHP having a stage size falling within a certain range. The invention sets forth a mathematical relationship between the conic constant and radius of curvature of an aspheric condenser lens in this family of lenses. For the specific OHP system described, these two variables must satisfy the equation $$(0.072 \times R) - 2.7 < k < (0.072 \times R) - 2.3$$

where R equals the radius of curvature and k equals the conic constant. The present invention also contemplates the use of low expansion borosilicate glass lenses for heat resistance.

BRIEF DESCRIPTION OF THE DRAWINGS

The novel features and scope of the invention are set forth in the appended claims. The invention itself, however, will best be understood by reference to the accompanying drawings, wherein:

DESCRIPTION OF THE PREFERRED EMBODIMENT

Figure 1:
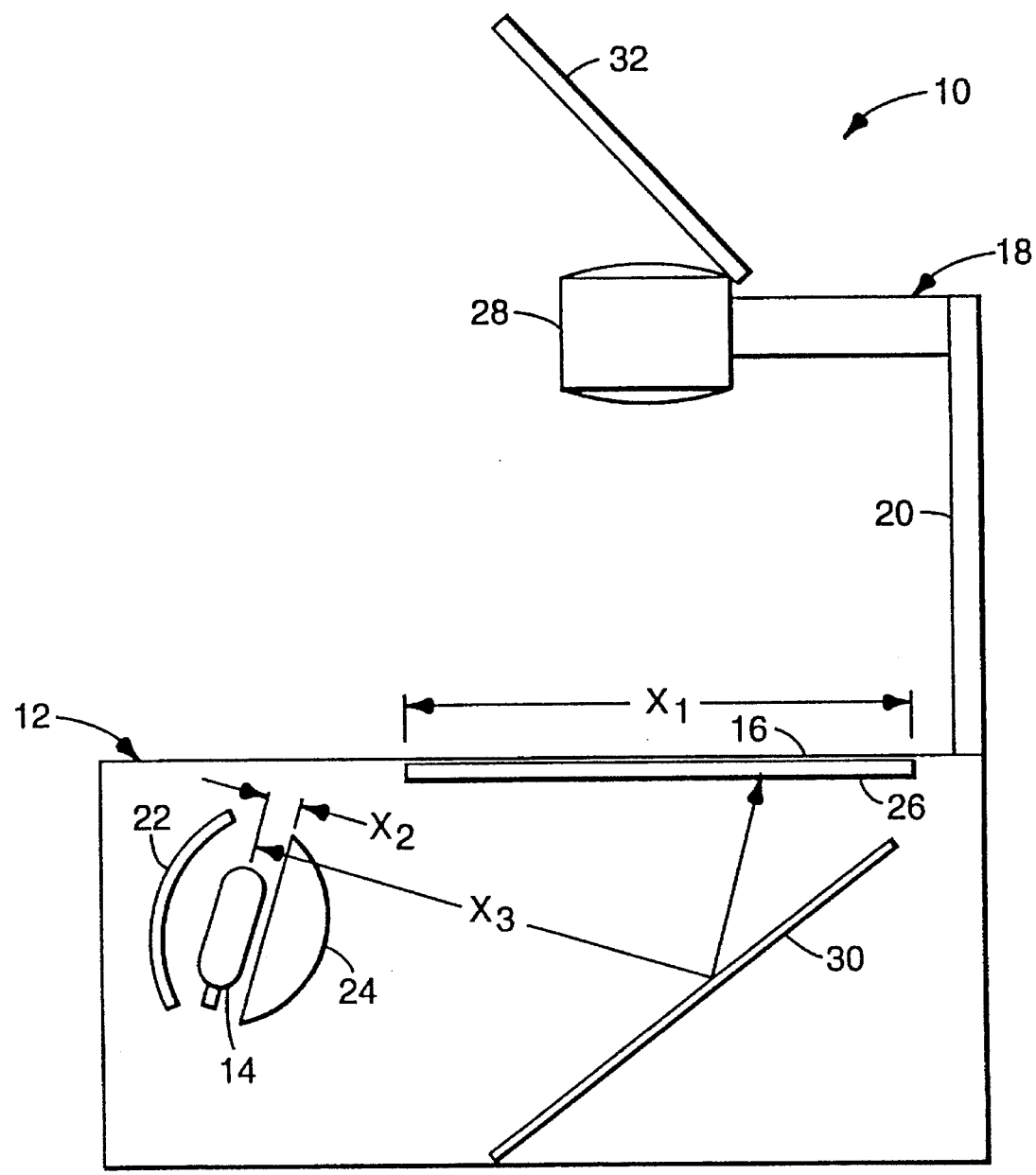
FIG. 1 is a schematic diagram of the optical system of an overhead projector constructed in accordance with the present invention.

With reference now to the figures, and in particular with reference to FIG. 1, there is depicted the overhead projector (OHP) 10 of the present invention. OHP 10 is generally comprised of a base 12 having a light source 14, a stage area 16, and a projector head 18 located above the stage and supported by arm 20. A back reflector 22 and a condenser lens 24 in base 12 direct light toward stage 16, and a fresnel lens 26 at the stage gathers the light and directs it to a projection lens 28 in head 18. A body mirror 30 may be used to fold the light path and reduce the height of base 12. Any transparent image placed on the stage, whether formed on a transparency sheet or in a liquid crystal display (LCD) panel, is focussed through lens 28, reflected off head mirror 32, and projected onto a screen. All of the foregoing components are conventional, except for condenser lens 24. Other conventional features are omitted from FIG. 1, such as the power supply for light source 14. The details of such features, and other conventional features which are optional, will become apparent to those skilled in the art upon reference to this specification.

Condenser lens 24 is designed to balance total luminous flux versus uniformity of illumination on the projection screen. In other words, a near maximum overall brightness may be achieved for a given corner-to-center ratio or, conversely, an excellent corner-to-center ratio may be realized based on a desired luminosity. Condenser lens 24 is aspheric (preferably a conicoid of revolution) and preferably plano-convex, and its shape is essentially defined by two parameters, its radius of curvature and its conic constant, as seen in the standard equation $$z = \frac{y^2}{R + \sqrt{R^2 - (1+k)y^2}}$$

where
z=longitudinal coordinate,
y=transverse coordinate,
R=radius of curvature, and
k=conic constant.

Aspheric lenses which are not strictly conicoids of revolution may be approximated by this equation and still have effective values for R and k. According to the present invention, the preferred value of k further depends upon that of R, which may vary within a certain range (given below). Therefore, the present invention actually describes a family of condenser lenses. The relationship of R and k is governed by the newly discovered equation $$(0.072 \times R) - 2.7 < k < (0.072 \times R) - 2.3 \quad (1)$$

where R and k are in millimeters.

The range of acceptable values for R has been determined with respect to a specific OHP system, namely, one in which the stage has a width or diameter ($x_1$ in FIG. 1) in the range of 250–290 mm (the width is measured across the center of the stage, rather than at the sides, since the corners of the stage are typically masked or truncated). Acceptable values for R lie in the range of 23–32 mm. The preferable values of other parameters (based on the aforementioned stage width) are as follows. The filament-to-condenser distance ($x_2$ in FIG. 1) is in the range of 8–13 mm; the filament to Fresnel distance ($x_3$ in FIG. 1) is in the range of 270–320 mm; the edge thickness of the condenser is in the range of 1–5 mm, and its diameter is in the range of 50–65 mm. The index of refraction of the glass material forming the condenser is preferably in the range of 1.46 to 1.49, which encompasses most borosilicate glasses. Borosilicate glass is desirable because of its high thermal endurance and low expansion, which becomes more important when condensers are placed in close proximity to high wattage lamps, such as are used in OHP's.

Figure 2:
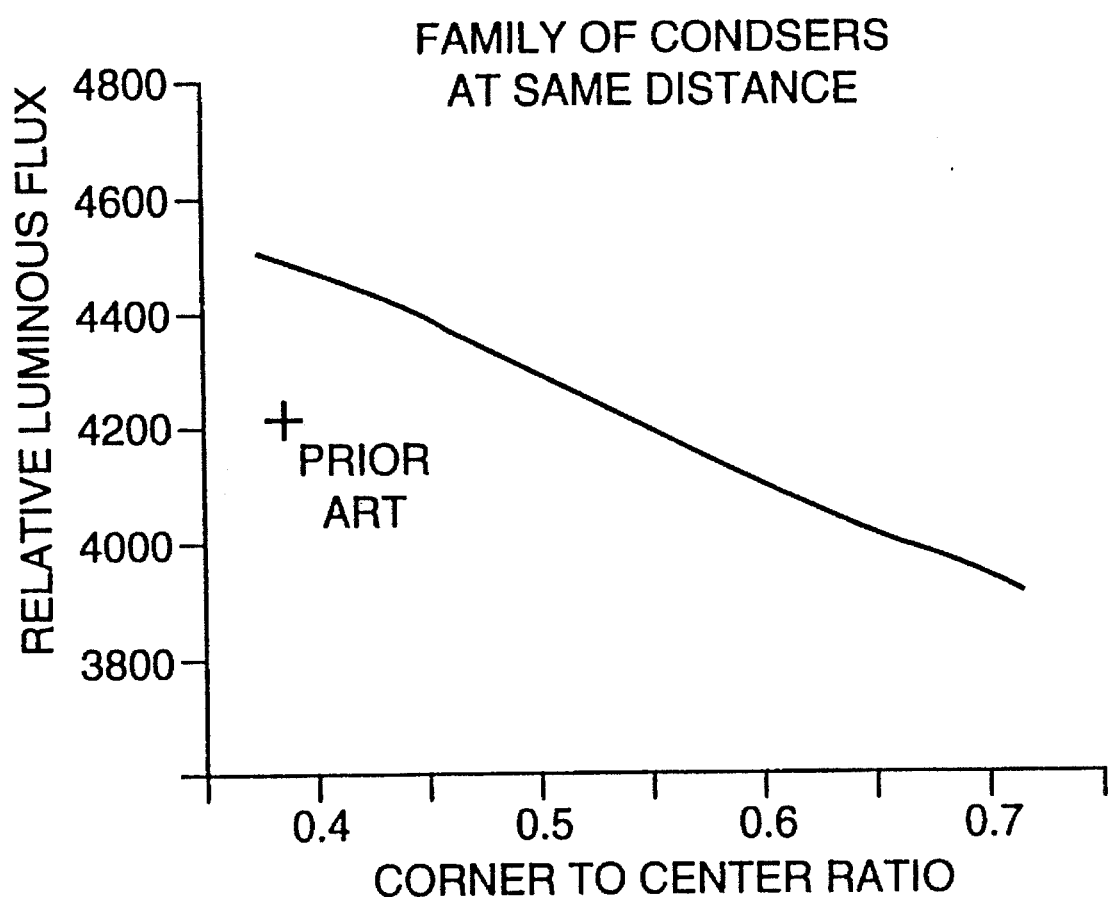
FIG. 2 is a graph whose curve represents the relationship between overall brightness and corner-to-center ratio in projected images using the family of condenser lenses constructed according to the present invention.

The relationship between total luminous flux and uniformity of illumination using the family of condensers described by the foregoing equation (1) is shown in FIG. 2. The total luminous flux is given in lumens, while the horizontal scale (corner-to-center ratio) is calculated with reference to ANSI standard IT7.215. This standard uses nine equally spaced detectors on the stage or projection screen in a square array; the corner-to-center ratio is the average illuminance at the four corner detectors divided by the illuminance at the center detector. The curve depicted in FIG. 2 represents the newly discovered family of condensers defined by equation (1), and may be compared against the "+" sign, which is an exemplary data-point from a prior art OHP system. Condensers in the new family, as compared to the prior art, can have either more lumens at the same corner-to-center ratio, or a higher corner-to-center ratio for the same luminosity. The curve is plotted within a corner-to-center range of 0.4–0.7; OHP's having a corner-to-center ratio in this range are considered to have excellent performance (cf. Japanese Industrial Standard B 7160 §5.5). Condenser lenses which are members of the family described herein provide performance, in terms of total luminous flux and uniformity of that flux, which is superior to the performance of previous designs. No prior art OHP's have a single condenser lens which imparts these luminosities for a given corner-to-center ratio.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. In particular, the profile of the condenser may be described in terms of a polynomial expansion, spline function or some other mathematical equation, but it will still have the same general shape and optical properties as the condensers specified herein. It is therefore contemplated that such modifications can be made without departing from the spirit or scope of the present invention as defined in the appended claims.

I claim:

1. A condenser lens for a projection system which directs light toward a stage area having a width in the range of about 250 to 290 mm, the lens being aspheric and having an effective radius of curvature R in the range of about 23 to 32 mm, and having an effective conic constant k in the range defined by the equation:

$$(0.072 \times R) - 2.7 < k < (0.072 \times R) - 2.3$$

where R is in millimeters.

2. The condenser lens of claim 1 wherein the lens has a diameter in the range of about 50 to 65 mm.

3. The condenser lens of claim 1 wherein the lens has an edge thickness in the range of about 1 to 5 mm.

4. The condenser lens of claim 1 wherein the lens is formed of a material having an index of refraction in the range of about 1.46 to 1.49.

5. The condenser lens of claim 1 wherein the lens is formed of borosilicate glass.

6. The condenser lens of claim 1 wherein the lens is a conicoid of revolution.

7. The condenser lens of claim 2 wherein the lens is formed of a material having an index of refraction in the range of about 1.46 to 1.49.

8. A method of constructing an aspheric lens designed for an overhead projector having a stage area whose effective width is in the range of about 250 to 290 mm, comprising the step of forming said lens with an effective conic constant k in the range defined by the equation:

$$(0.072 \times R) - 2.7 < k < (0.072 \times R) - 2.3$$

where R is the effective radius of curvature, in millimeters, of said lens.

9. The method of claim 8 further comprising the step of selecting a radius of curvature R in the range of about 23 to 32 mm.

* * * * *